Jan. 15, 1952  E. H. YOUNG  2,582,731
STAPLING MACHINE FOR APPLYING LABELS
Filed July 20, 1948  7 Sheets-Sheet 1
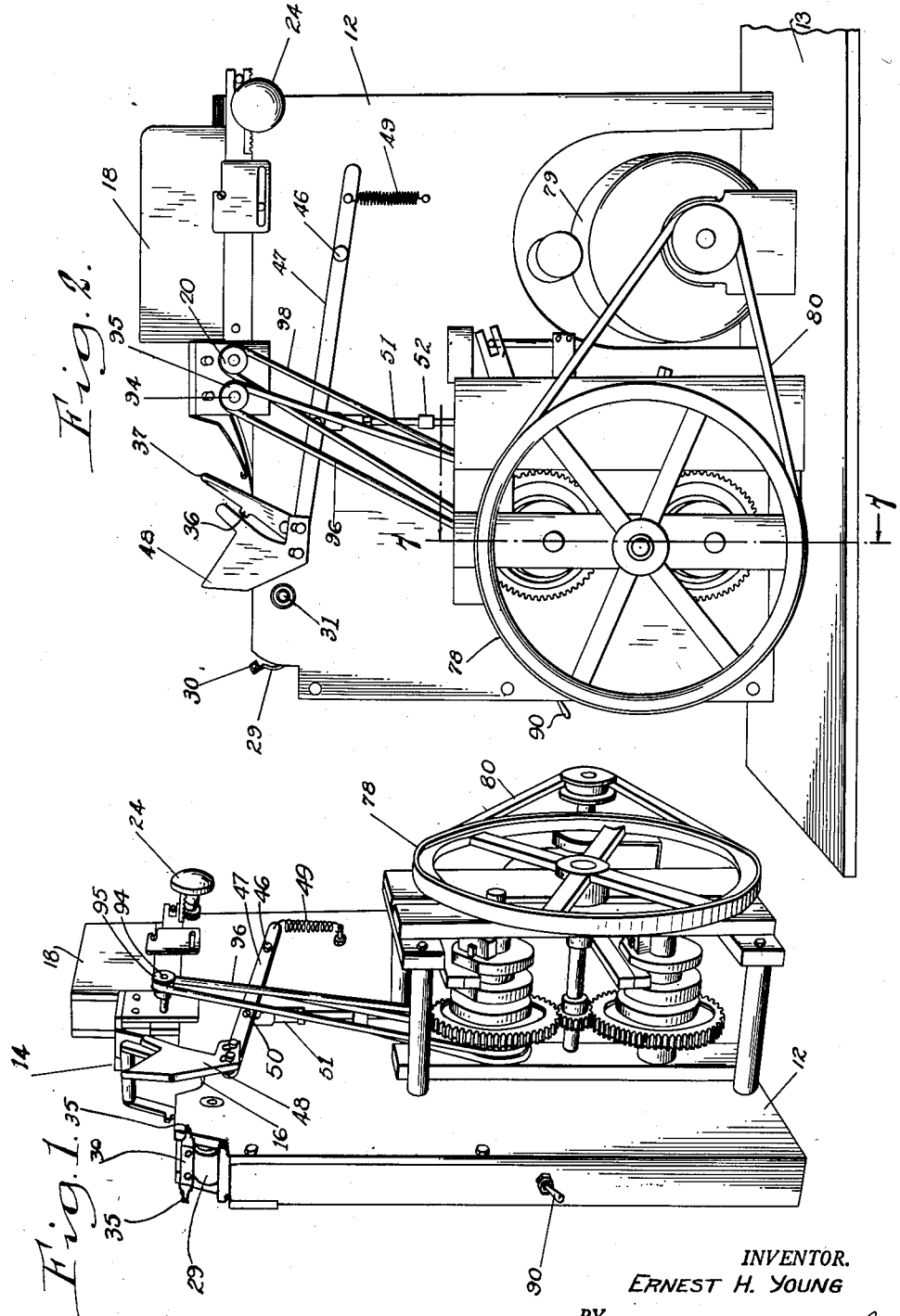
INVENTOR.
ERNEST H. YOUNG
BY
R. W. Brownell
Attorney Jan. 15, 1952     E. H. YOUNG     2,582,731

STAPLING MACHINE FOR APPLYING LABELS

Filed July 20, 1948     7 Sheets-Sheet 2

INVENTOR.
ERNEST H. YOUNG
BY
R. W. Brownell
Attorney

Jan. 15, 1952        E. H. YOUNG        2,582,731
STAPLING MACHINE FOR APPLYING LABELS
Filed July 20, 1948        7 Sheets-Sheet 3
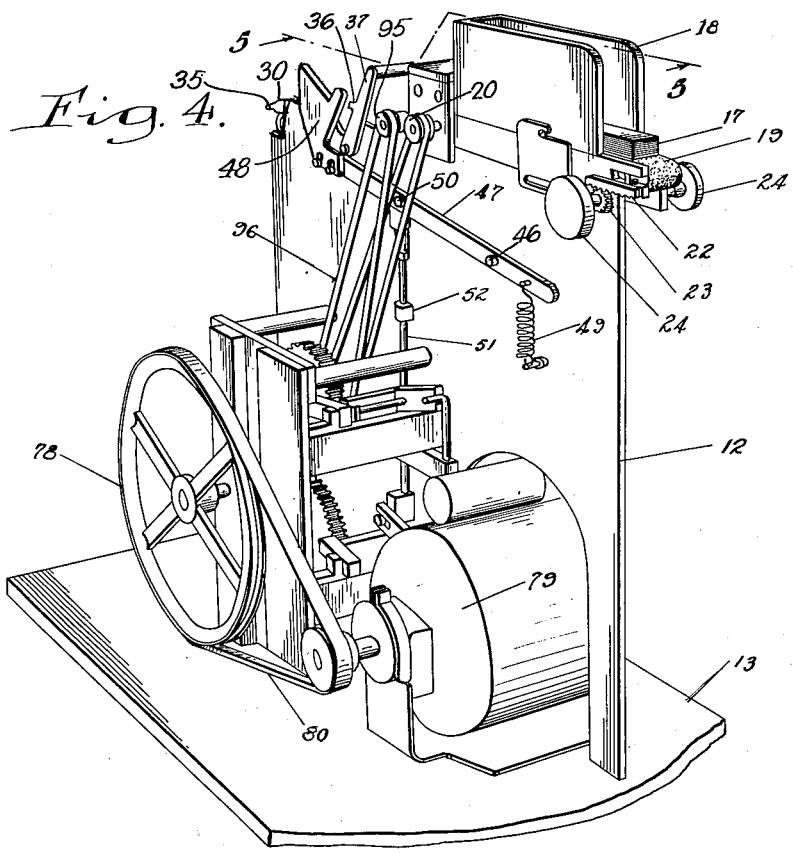
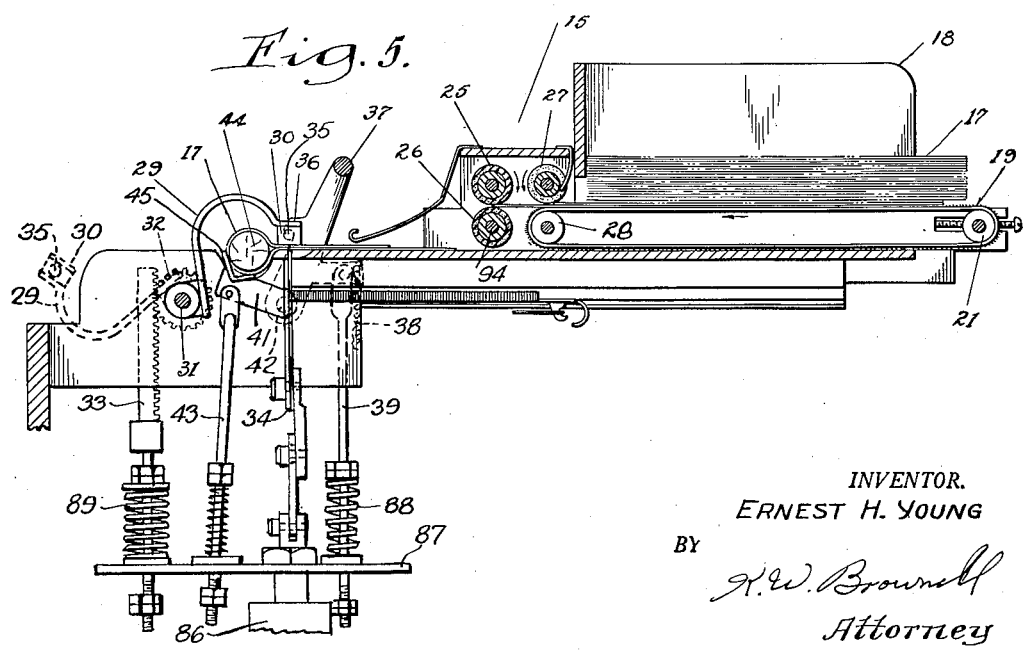
INVENTOR.
ERNEST H. YOUNG
BY
*R.W. Brownell*
*Attorney*

Jan. 15, 1952     E. H. YOUNG     2,582,731
STAPLING MACHINE FOR APPLYING LABELS
Filed July 20, 1948     7 Sheets-Sheet 4
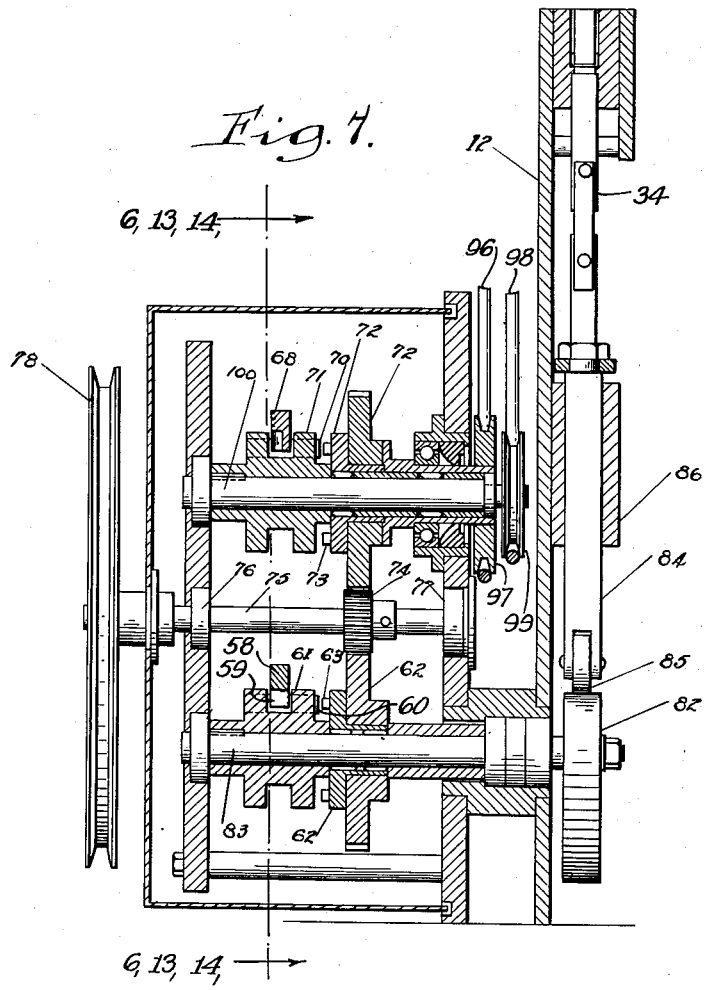
INVENTOR.
ERNEST H. YOUNG
BY
K. W. Brownell
Attorney Jan. 15, 1952 E. H. YOUNG 2,582,731
STAPLING MACHINE FOR APPLYING LABELS
Filed July 20, 1948 7 Sheets-Sheet 5
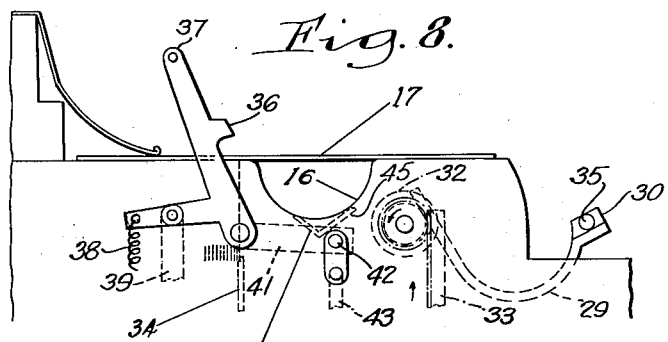
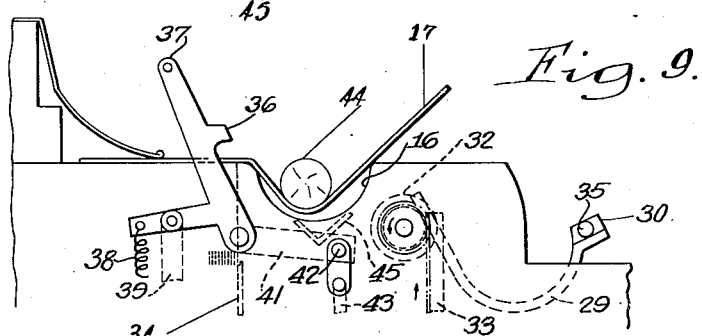
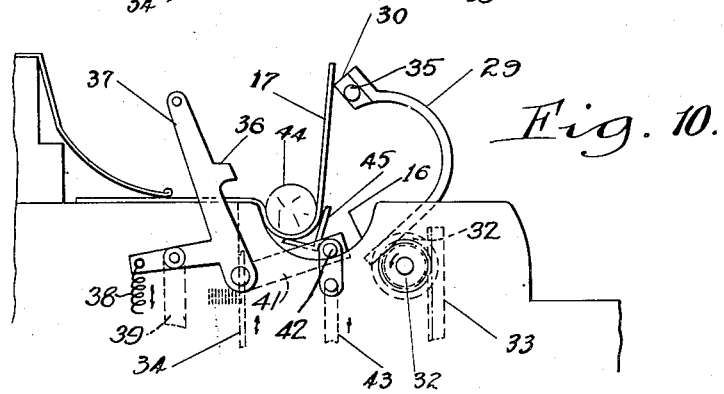
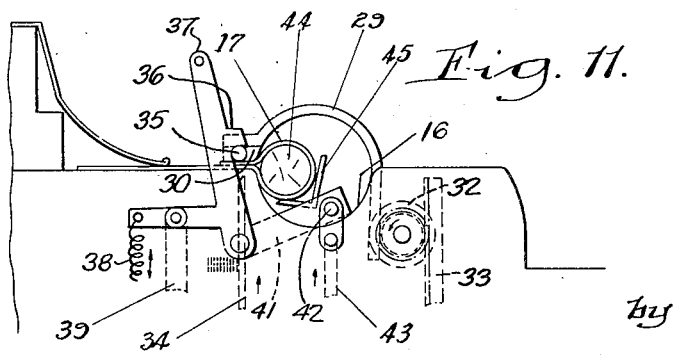
Inventor
ERNEST H. YOUNG
by R.W. Brownell
Attorney Jan. 15, 1952     E. H. YOUNG     2,582,731
STAPLING MACHINE FOR APPLYING LABELS
Filed July 20, 1948     7 Sheets-Sheet 6

Inventor
ERNEST H. YOUNG
by K. W. Brownell
Attorney

Inventor
ERNEST H. YOUNG
by K. W. Brunell
Attorney

Patented Jan. 15, 1952

2,582,731

UNITED STATES PATENT OFFICE 2,582,731

STAPLING MACHINE FOR APPLYING LABELS

Ernest H. Young, Niagara Falls, N. Y., assignor to Comstock & Wescott, Inc., Cambridge, Mass., a corporation of Massachusetts Application July 20, 1948, Serial No. 39,756

8 Claims. (Cl. 1—42.6)

This invention relates to labeling apparatus adapted to perform the operation of attaching labels or tying elements to various articles of commerce or manufacture and particularly for the attachment of identifying labels to nursery stock or tying means to packaged nursery stock, or the tying together of bundles of articles by an encircling band of strip material which is stapled or otherwise secured in place.

Although the invention is primarily described herein as it pertains to and as particularly adapted for attaching identifying and/or instructional labels to nursery stock it is readily applicable to the tying together of bundles of individual items by the encirclement of a plurality of pieces by one or more encircling bands of strip material secured about the bundle, such as, for example, the bundling of cut flowers, asparagus, rhubarb or the like for marketing.

Heretofore the labeling of nursery stock and similar merchandise, has been a manual operation in which the desired identifying label which has been often of the eyelet type provided with a short length of wire or twine extending therefrom has been attached to the packaged article by placing the article or group of articles between the two strands of wire or twine and then twisting the ends together in the case of wires or tying twine into one or more knots to hold the label in place. Consequently, the labeling of shrubs and other nursery stock, as well as comparable bundling and/or labeling operations required in preparing many other articles for market, has been a laborious, time-consuming operation. Especially in the nursery trade which is highly seasonal in nature, it has long been the desire to reduce the time and labor necessary for each operation to an absolute minimum. Moreover, the eyelet and wire form of identifying tag or label is relatively expensive, which further adds to the cost involved. Also, if the wire is twisted tightly around nursery stock and not loosened by customer on planting, when stock grows the wire often chokes the shrub or tree so that it dies with resulting dissatisfaction to customer and with claim for replacement against supplier. Furthermore, the security and firmness with which the label is attached and/or the article bundled has been dependent to a large extent upon the skill of the individual operator, and when a limited time is available and those handling the shrubs are rushed the articles often lose their labels or become undone due to faulty attachment.

It is an object of the present invention to provide an apparatus for labeling shrubs and nursery stock, or other articles of commerce, which not only reduces the time and labor required to a minimum, but which uses a less expensive form of label, and provides a more dependable labeling.

It is a further object to provide an apparatus for labeling or bundling purposes which eliminates the time-consuming manual labor heretofore involved in such operations.

It is a further object of this invention to eliminate what a prominent nurseryman has said he most abhorred about the nursery business,— namely, the requirement of a grown-up man spending day after day twisting tiny wires around nursery stock. In addition to the marked labor saving obtained by a machine of the herein-described invention which will do the work of about ten men by hand, there are further benefits since frequently after a time the laborers' hands and fingers become sore and festered from cuts and pricks (largely from the ends of the wires), this greatly slows him down. If he wears gloves to protect his hands, his output is greatly diminished because his fingers are all thumbs.

Other advantages accruing from the present invention will become obvious as the description proceeds.

The labeling or bundling machine of the present invention is composed of several essential components, all of which coact with one another and function jointly, as follows:

(a) A magazine or holder is provided for furnishing a supply of labels to the labeling mechanism. Although in the specific embodiment depicted in the drawing, the magazine is adapted for holding a stacked supply of individual strip labels which are fed singly to the labeling mechanism, the magazine or holder can be constructed so as to carry a coil or roll of continuous strip material which may or may not be scored, perforated or otherwise provided with lines along which the strip material can be regularly severed. The necessary identifying indicia, instructional matter or other information normally printed on each label when separate labels are used, in the case of a continuous coil, can be printed along the strip at regular intervals on on or both sides.

(b) Feeding mechanism is provided for feeding the individual labels singly from the magazine to the labeling mechanism, or advancing a predetermined length of strip material from a coiled supply and severing it or otherwise completing its rupture along previously established score lines.

(c) A receiving head is provided to support the shrub and label during the labeling operation. The receiving head and accompanying structure also serve as the supporting means upon which are carried the label folding arm, label compression member, the stapling or other fastening device and associated mechanisms and actually constitutes an integrated structure about which the entire apparatus centers.

(d) A compression member and folding arm adapted to bring the shrub or other article or articles to be labeled together with the label into position adjacent the stapling mechanism with the label folded around and tightly compressed against the article are provided and constitute a particular feature of the present apparatus since they are so designed as to permit the use of the same machine in the labeling or bundling of articles of different size. However, the labeling apparatus can be specifically designed to accommodate articles of any one selected size, in which case the receiving head is provided with a recess adapted to conveniently accept articles of the desired size so that the article will normally rest in a position adjacent the stapling mechanism although it is preferred to provide a mechanism such as shown in the accompanying drawing wherein provision is made for the labeling or bundling of articles varying in size by provision of means for bringing articles which are under full capacity size of the recess into position adjacent the stapling device with the label tightly enclosing the article ready for the stapling operation.

(e) Conventional stapling mechanism or other fastening means is provided to secure the end of the label in place about the article after it has been brought into position.

(f) Finally, power engaging and disengaging mechanisms together with actuating devices are provided, whereby the various operations involved are performed in the proper sequence, the cycle of operations being initiated when the article or articles to be labeled or bundled are placed in position on the receiving head. The specific power engaging and disengaging mechanism shown in the drawing comprises a pair of single revolution clutches which are set in motion by suitable associated tripping mechanisms actuated by insertion and removal of the article or group of articles in the recess of the receiving head. However, equivalent devices can be employed for obtaining the same action, such as by use of switches or contact devices which energize a solenoid.

Reference is made to the accompanying drawing depicting schematically various views of a preferred embodiment of the present invention, and in which Figure 1 is a perspective view of the right hand side of the labeling machine looking at the machine from an angle to the front. The machine is shown with the enclosing hood for the driving mechanism removed in order to show various details of construction;

Figure 2 is a side elevational view of the right hand side of the machine shown in Figure 1;

Figure 4 is a perspective view of the right hand side of the machine looking at the machine from an angle to the rear;

Figure 5 is a vertical sectional view of a portion of the machine taken through the line 5—5 of Figure 4, showing further details of the label feeding and securing mechanisms;

Figure 7 is a vertical sectional view through the line 7—7 of Figure 2;

Figures 8, 9, 10 and 11 are four side elevational schematic views of a modified form of label folding mechanism, and in which Figure 8 shows the label in the position it occupies after it has been ejected from the feeder.

Figure 9 shows the label as it is bent or deflected by the shrub or other article being labeled and just prior to tripping the actuating mechanism;

Figure 10 shows the folding arm in half-way position and shows how the compression member has moved the shrub over into position for stapling and is holding the label tightly against the shrub or article being labeled;

Figure 11 shows the operation of folding the label about the shrub or other article completed and in final position for stapling;

Figure 3:
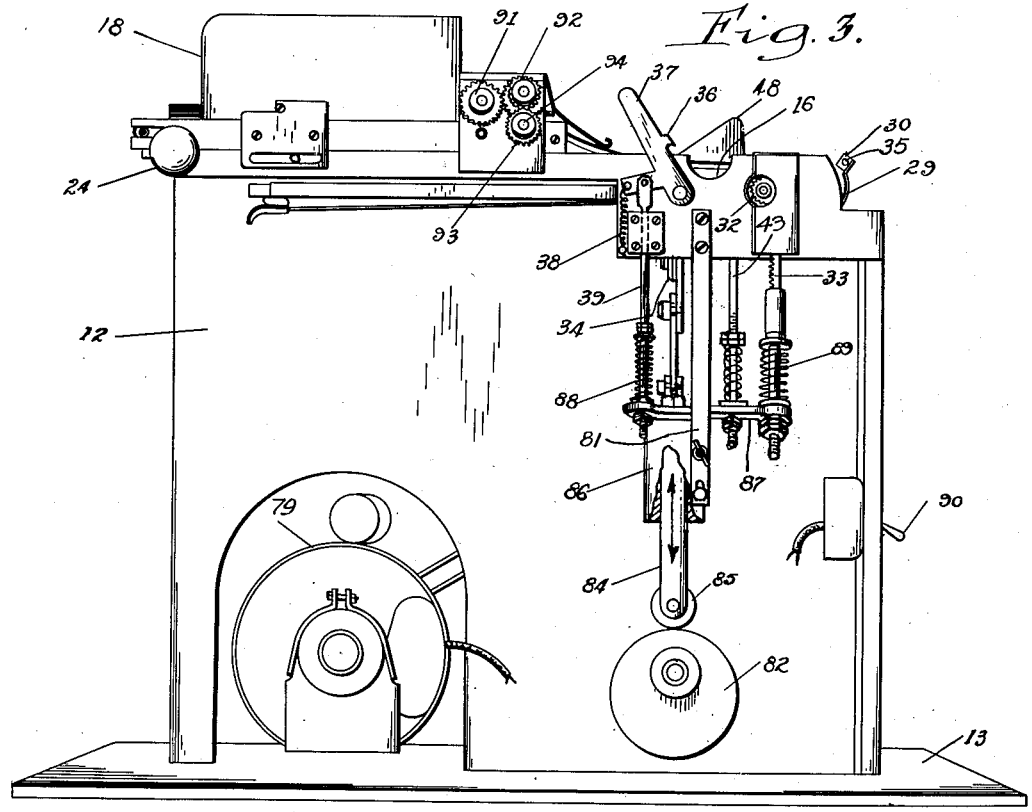
Figure 3 is a side elevational view taken from the opposite or left hand side of the machine.

Referring in further detail to the various figures of the drawing in which like numerals in the various figures refer to the same parts, the particular embodiment of labeling or bundling machine shown comprises a receiving head comprising a vertically disposed steel plate 12 supported on a base or platform 13 (omitted in Figures 1 and 7) and upon which are mounted the labeling mechanism which is referred to generally by the reference numeral 14 and the magazine and label feeding mechanism generally designated by 15. As shown, the plate 12 is provided with a semi-circular recess 16 adapted to receive that portion of the shrub to which the label 17 is to be attached and across which the label is placed by the feeding mechanism.

Figure 12:
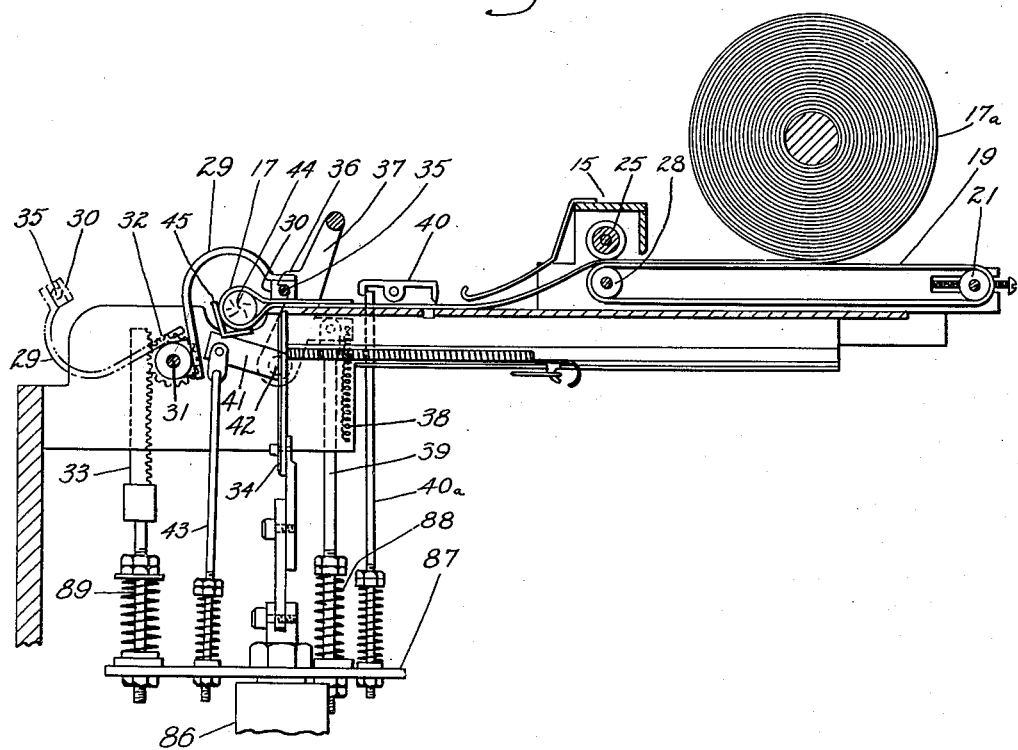
Figure 12 is a view comparable to that of Figure 5, but showing a modified form of label supply in which the labels are furnished as a roll of continuous strip material.

Referring in particular to Figure 5, a magazine or holder 18 adapted to carry a stacked supply of the individual labels 17 is mounted on the top and to one side of the plate 12 together with means for feeding the labels one at a time into labeling position. Figure 12 shows an alternative construction wherein a roll of strip label material 17a is provided in place of the stacked supply of individual labels 17. The feeding means shown comprises an endless friction belt 19 such as a belt made of rubber or abrasive coated cloth, carried by rollers 20, 28 (Fig. 5). The surface of the belt constitutes the floor or base of the label magazine 18. The position of the magazine and friction feed belt along the top of plate 12 with respect to the labeling mechanism can be adjusted to accommodate labels of different lengths by means of the rack 22 and gear 23 which are operated by knobs 24. Movement of the friction belt 19 in the direction of the arrow advances the bottom label of the stack until its forward end is caught between upper and lower rubber rimmed nip rolls 25 and 26 which then carry the label forward to deposit it across the recess 16 in position for use. The kick back roll 27 which is spaced approximately the thickness of one label above the upper surface of the friction belt serves to retard the passage of more than one label at a time from the magazine. When a roll of labeling material is used a conventional severing knife 40 which is operated synchronously with the folding and stapling mechanisms through rod 40a connected to cross bar 87 and which is forced up to cut the strip material when the staple is driven.

A label folding arm 29 (Figure 5) provided with anvil head 30 is movably mounted on shaft 31 on which is also mounted gear 32 which meshes with rack gear 33. When the rack gear 33 is raised the folding arm is moving in a clock-wise direction to an arc from the position shown in dotted lines in Figure 5 in a final position as shown by its solid line position in Figure 5, in which latter position the anvil head 30 is pressed firmly against the label in position to coact with the driving head or arm 34 of a conventional stapling mechanism. The folding arm in its arcuate movement follows the label during its folding action and forces the label around the shrub into position for stapling, as shown in detail in Figures 8, 9, 10 and 11. The anvil head 30 is provided with side lugs or pins 35 which during the stapling operation are engaged by the projecting fingers 36 of locking arms 37 which are pivotally mounted to move into position to secure the anvil head against displacement while the staple is being driven. The spring 38 immediately snaps the locking arm back away from its locking engagement with the anvil head upon withdrawal of the extension arm 39, which is connected to locking arm 37 and which upon upward movement of the cross bar 87 forces the locking arm into position with the anvil head thereof in position for the driving of the staple. The vertical bar 81 serves no functional purpose but merely as a tie member between bearing 86 and the frame 12.

Referring specifically to Figure 5, a compression member comprising bar 41 which is mounted pivotally at 42 and has mounted thereon permanent cradle 45, the compression member being actuated by elevation of an extension arm 43 (Fig. 5) which moves to compress the label tightly around the shrub or article 44 which is to be labeled and forces the article and its surrounding label over to a position not closely adjacent the stapling mechanism.

Figures 8, 9, 10 and 11 depict in greater detail the compression member comprising a tiltable cradle 45, which when raised by elevation of an extension arm 43 tilts sideways to fold the label and compress it tighter against the shrub or article and bring the two over and against the stapling position with the label closely contiguous to the shrub or article in position for stapling. The various figures show the positions taken by the compression member and the manner in which it functions towards the article and label during the progressive stages of the labeling operation leading up to the actual stapling operation. Details of the stapling mechanism are not shown since any conventional stapling head can be used and the details thereof are too well known and available to require further description.

Figure 6:
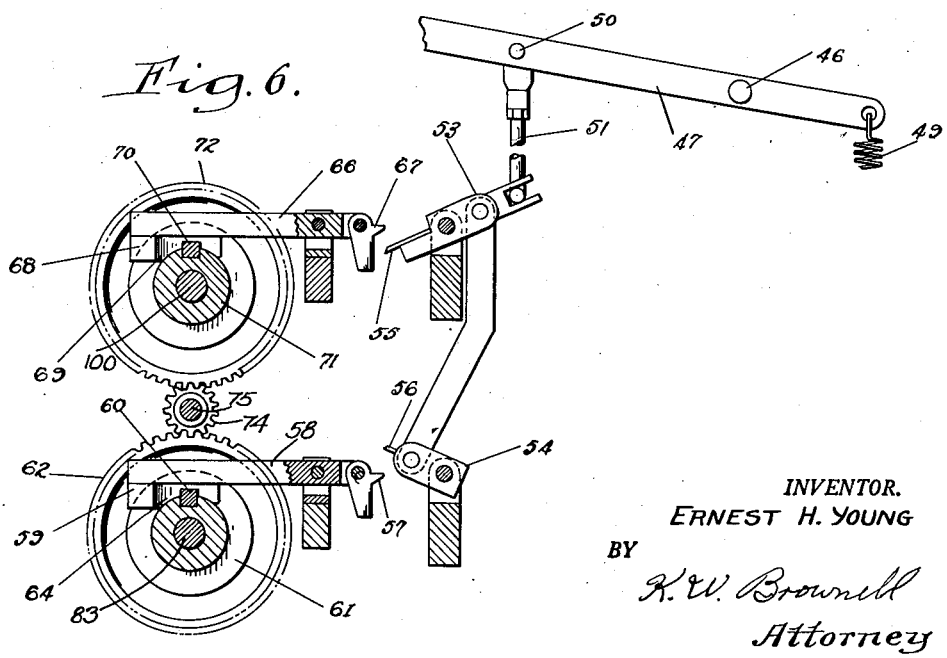
Figure 6 is a vertical schematic view, partially in section, through lines 6, 13, 14—6, 13, 14 of Figure 7, showing further details of the clutch and actuating mechanisms.

The mechanisms are set into operation by means of a trip lever 47 provided with a trip lever head 48, the trip lever being attached to the plate 12 by means of pivot pin 46, with the pressure required to actuate the trip lever controlled by tension spring 49 having one end fastened to plate 12 and the other end fastened to the trip lever. The trip lever head is positioned across the semi-circular receiving recess 16 and is depressed by the insertion of a shrub or other article in the recess 16. Fastened to the trip lever 47 by a pivotal mounting 50 is a downwardly depending arm 51 which passes through a bearing block 52 mounted on plate 12 and extends down to engage the tripping devices for the clutch mechanisms. Referring particularly to Figure 6 for further details of the clutch actuating system the extension arm is fastened to the pivotally mounted cross pieces 53, 54, provided with trip dogs 55, 56 in such manner that upon downward movement of arm 51 trip dog 56 engages trip pawl 57 and raises trip lever 58 and throw-out dog 59, allowing the power dog 60 on the power driven clutch spool to engage the driving clutch 62 through dogs 63. The throw-out dog 59 is provided with a tapered side 64 so that the power dog 60 is engaged thereby and gradually withdrawn from engagement with the dogs 63 of the driving clutch during one revolution of the clutch spool 61. Upon the reverse or upward movement of arm 51 the upper clutch mechanism which serves to actuate the label feeding mechanism, is actuated through a single revolution in like manner. As in the case of the lower clutch, which actuates the labeling mechanisms, the upper clutch and its associated actuating device comprises a trip lever 66 provided with a trip pawl 67 and a throw-out dog 68 having a tapered side 69, a power dog 70 mounted in driven clutch spool 71 and adapted to engage the driving clutch 72 through dogs 73 when released by withdrawal of the throw-out dog 68. The two driving clutches 62 and 72 are geared to a common pinion gear 74 mounted on shaft 75 which is journalled in bearings 76, 77 and provided with a pulley drive wheel 78 which is connected to a motor 79 by means of a driving belt 80.

An eccentric or cam plate 82 is also mounted upon the shaft 83, upon which the clutch mechanism for the labeling mechanisms is mounted. Positioned above the cam plate 82 so as to be moved by the rotation of the cam plate is a rod or extension arm 84 provided with a freely rotatable wheel 85 bearing on the cam plate 82. The extension arm 84 is mounted in bearing block 86 so as to be free to move vertically upon revolution of the cam plate and is provided with a cross bar 87 extending over to rack gear 33, extension arm 39 and the driving head 34 for the stapler so that a single revolution of the cam plate 82 which takes place when the lower driven clutch is actuated, serves to impart vertical upward movements to the various actuating devices of the labeling mechanism. Springs 88 and 89, which are compressed when the cam plate raises the various extension arms, serve to bring the devices back into their normal positions of rest shown in the Figure 3.

Referring to further details for actuation of the label feeding mechanism (Figure 5) which is set in operation by the upper clutch mechanism the nip rolls 25, 26 and kick back roll 27 operate continuously as soon as the power switch 90 is turned on and are driven by intermeshing gears 91, 92 and 93 (Figure 3), the latter gear being mounted on shaft 94 on which is mounted pulley 95 (Figure 4) connected by drive belt 96 (Figure 4) to drive wheel 97 which is mounted for continuous revolution. Wheel 20 (Figures 2 and 3) which serves to drive the friction feed belt 19 is operated intermittently by actuation of the upper clutch mechanism, being connected through drive belt 98 to pulley 99 (Fig. 7) which is mounted on shaft 100 and is rotated through one revolution upon rotation of clutch spool 71 of the upper clutch mechanism.

Figure 13:
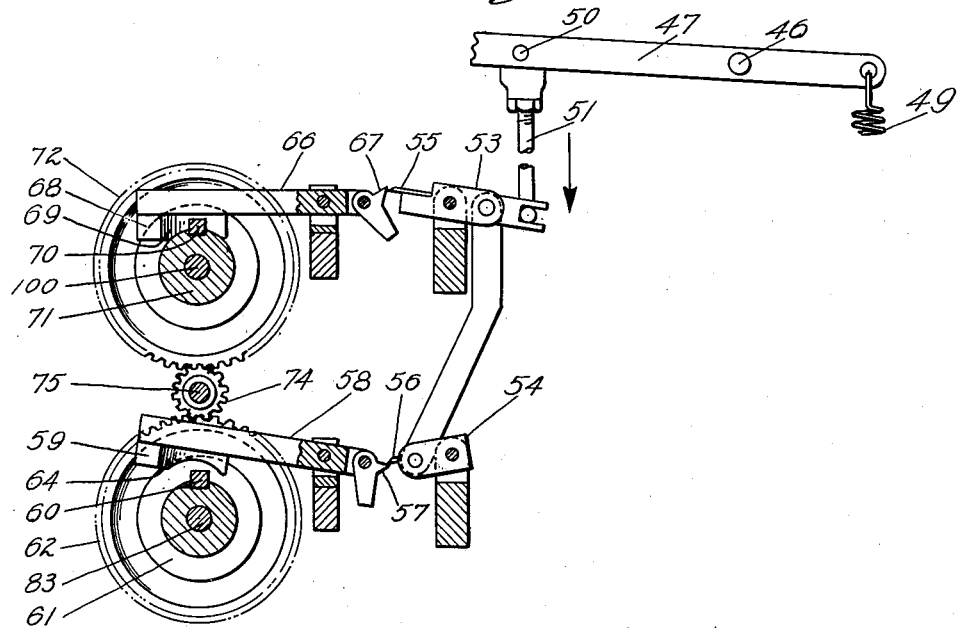
Figures 13 and 14 are views similar to Figure 6 and through the sectional line 6, 13, 14 of Figure 7 and show the position of the trip mechanisms in the downward and upward position, respectively.

Operation of the machine hereinabove described is as follows:

Assuming that the power switch 90 has been turned on and a supply of labels 17 has been placed in the magazine 18 (Figure 4) with one label resting in labeling position across the recess 16 (Figure 8) of the plate an article to be labeled such as the upper or tip portion of a packaged shrub or bundle of nursery stock is laid across the recess 16 (Figure 9), thereby depressing the trip lever 47 by forcing the head 48 thereof downward to a level even with the bottom of the recess 16. Depression of trip lever 47 (Figure 13) pushes the extension arm 51 downwardly which pivots element 54 bringing trip dog 56 down against trip pawl 57, thereby lifting trip lever 58 and throw-out dog 59 momentarily out of engagement with clutch spool 61. Power dog 60, no longer being under detention by the throw-out dog 59, engages the dogs 63 of driving clutch 62 (Figure 7). The clutch spool 61 is then driven through a single revolution before the curved face 64 of the throw-out dog engages the power dog again and withdraws the latter from engagement with the driving clutch. Revolution of the clutch spool 61 through a single revolution carries the cam plate 82 (Figure 3) also through a single revolution, thereby pushing extension rod 84 up with consequent raising of the associated extension arms 33 and 39 as well as head 34 of the stapler, all actions taking place in the desired sequence by reason of the length of the respective arms and exact period of movement within the overall time of the single revolution of the cam plate. In sequence, the extension arm 43 is the first to be actuated and serves to initiate movement and compression of the label 17 (Figure 10) against the article being wrapped and to compress the two sideways adjacent to the stapling head. At substantially the same time the rack gear 33 is forced up, bringing the folding arm 29 around through a swinging arc to carry with it the label 17, finally bringing the anvil head 30 down next to the head plate over the end of the label which is thereby held in position for the stapling operation (Figure 11). Extension arm 39 is then moved up to force the locking arm 37 into engagement with the fingers 35 of the anvil head so as to lock it firmly in position for the stapling action (Figure 11). The stapling head 34 is then carried upward to drive the staple home. Upon return of the cam to its original position after completion of the single revolution the extension arms return to their normal position of rest.

Figure 14:
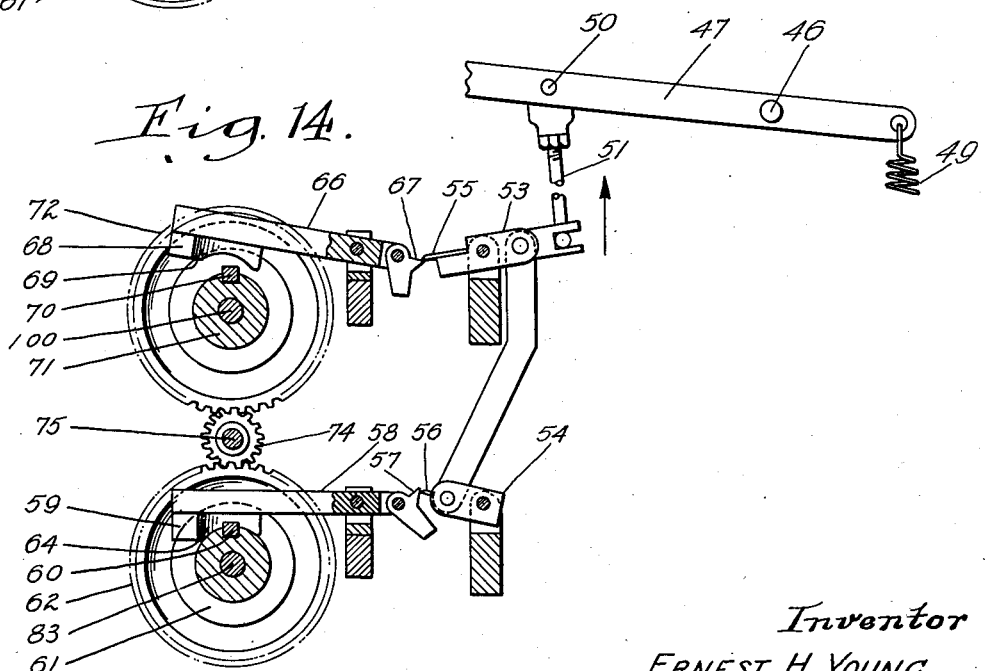

The article which has been labeled by the actions described is removed from the recess, whereupon trip lever 47 moves upwardly to its original position (Figure 14). However, in its return movement cross-element 53, which in the downward movement of the rod 51 had been brought to a position with the trip dog 55 above the trip pawl 67, is pivoted to bring the trip dog 55 down against trip pawl 67. The upper clutch mechanism (Figure 7), which is the clutch for actuating the label feeding device, is then actuated through a single revolution in the same manner as that previously described for the lower clutch mechanism. Upon revolution of the upper clutch spool 71 through a single revolution, pulley wheel 99 which is mounted on the same shaft is also set in motion, thereby causing wheel 20 to revolve and carry the friction feed belt 19 forward (Figures 4 and 5). The forward movement of the friction feed belt 19 advances the bottom label of the stack to a point where its forward end is grabbed between the nip rolls 25, 26 (Figure 5) and the label carried forward to be deposited across the recess 16 in position for the next labeling operation, thereby completing one cycle of operation of the machine. The entire operation of labeling an article and feeding forward the label for the next operation takes place in the matter of one or two seconds.

When the label supply is furnished as a roll of continuous strip material, as shown in Figure 12, the label material is advanced, stopped, and cut from the roll by operation of the mechanism in a manner very similar to that described above when a stacked supply of separated labels are used, and is as follows: Upon revolution of the upper clutch spool 71 (Figure 7) through a single revolution, pulley wheel 99 (Figure 7) which is mounted on the same shaft is also set in motion, thereby causing wheel 28 (Figure 12) to revolve and carry the friction feed belt 19 forward. The forward movement of the friction feed belt 19 carries the leading portion of the labeling strip forward to be deposited across recess 16 (Figure 3) in position for the labeling operation. The labeling operation is carried out the same as when separate labels are used except that when a roll of labeling material is used a conventional severing knife 40 which is operated synchronously with the folding and stapling mechanisms through rod 40a connected to cross bar 87 is forced up to cut the strip material when the staple is driven.

Having described the present invention in detail and how it operates, it is desired to claim:

1. In a machine for applying a label to an article, a head having a recess therein, means for supporting a plurality of labels, means for moving a label from said supporting means to a position overlying the recess, a trip lever mounted for movement on the head and having a portion arranged laterally of said recess and above the lowermost portion of the recess so that the lever is moved downwardly when the article is moved downwardly into the recess, a folding arm mounted for swinging movement on the head to engage a free end of the label, means for swinging said folding arm upon depression of said trip lever to engage and turn the label about the article in said recess, stapling means operable to staple portions of the label embracing the article to each other, and means to operate said stapling means.

2. In a machine for wrapping a flexible label about an article, a head having an article receiving station thereon, means for holding a supply of labels, means for moving a label from said means to a position overlying said receiving station, an arm mounted for movement on said head for engaging an end portion of the label, means operable upon application of an article to the receiving station over the label to move said arm whereby the arm wraps the label around the article and arranges said end portion of the label adjacent another portion thereof, stapling means operable when the label is wrapped around the article to staple the end portion thereof to another portion of the label, and means to operate said stapling means.

3. In a machine for wrapping a label about an article, a head having an article receiving station thereon, means for storing a supply of labels, means for moving a label from said storage means to a position overlying said receiving station, an arm mounted for movement on said head for engaging an end portion of the label, means operable upon application of an article to the receiving station over the label to move said arm whereby the arm moves an end portion of a label around the article and arranges said end portion of the label adjacent another portion thereof, means for pressing the label into engagement with the article as the end portion is wrapped therearound, stapling means operable when the label is wrapped around the article to staple the end portion thereof to another portion of the label, and means for operating the stapling means and elevating the lifting member.

4. In a machine for applying a label to an article, a head having a recess therein, means on the head for supporting a label overlying the recess, a trip lever mounted for movement on the head and having a portion arranged laterally of said recess and above the lowermost portion of the recess so that the lever is moved downwardly when the article is moved downwardly into the recess over the label, a folding arm mounted for movement on the head to engage a free end of the label, means for moving said folding arm upon depression of said trip lever to engage the label and to turn it about the article in said recess, means pressing the label against the article as it is wrapped therearound, stapling means operable to staple portions of the label embracing the article to each other, and means for actuating the stapling means.

5. In a machine for securing a label to an article, a head having a recess therein, means on the head supporting a label overlying the recess, a trip lever mounted for movement on the head and having a portion arranged laterally of said recess and above the lowermost portion of the recess so that the lever is moved downwardly when the article is moved into the recess over the label, a folding arm mounted for pivoting movement on the head to engage the label, means for pivoting said folding arm upon depression of said trip lever to engage the label and to turn it about the article in said recess, means pressing the label against the article as the folding arm wraps the label therearound, stapling means operable to staple portions of the label embracing the article to each other, means for actuating the stapling means, means for raising the trip lever when the article is removed from the recess, means storing a supply of labels, and means operable upon upward movement of the lever to move a label from said storage means to a position on first means to overlie said recess.

6. In a machine for wrapping a label about an article, a head having an article receiving station thereon, means for storing a supply of labels, means for moving a label from said storage means to a position overlying said receiving station, an arm mounted for movement on said head for engaging an end portion of the label, means operable upon application of an article to the receiving station over the label to move said arm whereby the arm moves an end portion of a label around the article and arranges said end portion of the label adjacent another portion thereof, means for pressing the label into engagement with the article as the end portion is wrapped therearound comprising a vertically moveable lifting member provided with a tilting cradle which, when the lifting member is elevated, presses the label about the article and brings the label-enwrapped article into position for stapling, stapling means operable when the label is wrapped around the article to staple the end portion thereof to another portion of the label, and means for operating the stapling means.

7. In a machine for wrapping a label about an article, a head having an article receiving station thereon, means for storing a supply of labels, means for moving a label from said storage means to a position overlying said receiving station, an arm mounted for movement on said head for engaging an end portion of the label, means operable upon application of an article to the receiving station over the label to move said arm whereby the arm moves an end portion of a label around the article and arranges said end portion of the label adjacent another portion thereof, means for pressing the label into engagement with the article as the end portion is wrapped therearound comprising a vertically moveable lifting member having mounted thereon a pivotally mounted pressure arm which, when the lifting member is elevated, presses the label about the article and brings the label-enwrapped article into position for stapling, stapling means operable when the label is wrapped around the article to staple the end portion thereof to another portion of the label, and means for operating the stapling means and elevating the lifting member.

8. In a machine for applying a label to an article, a head having a recess therein, means for supporting a plurality of labels, means for moving a label from said supporting means to a position overlying the recess, a trip lever mounted for movement on the head and having a portion arranged laterally of said recess and above the lowermost portion of the recess so that the lever is moved downwardly when the article is moved downwardly into the recess, a curved folding arm provided with an anvil head and mounted for swinging movement on the head to engage a free end of the label, means for swinging said folding arm upon depression of said trip lever to engage and turn the label about the article in said recess and bring the free end into position beneath the anvil head of said folding arm, means to lock said anvil head in position, stapling means operable to staple portions of the label embracing the article to each other, and means to operate said stapling means.

ERNEST H. YOUNG.

REFERENCES CITED

The following references are of record in the file of this patent:

UNITED STATES PATENTS

| Number | Name | Date |
|---|---|---|
| 1,041,987 | Engberg | Oct. 22, 1912 |
| 1,993,799 | Phillips | Mar. 12, 1935 |